June 25, 1940.  L. J. FOX  2,205,773
FISH LURE
Filed April 6, 1939

INVENTOR.
BY  Leo J. Fox.
Geo. Stevens
ATTORNEY.

Patented June 25, 1940

2,205,773

UNITED STATES PATENT OFFICE 2,205,773

FISH LURE

Leo J. Fox, Keewatin, Minn.

Application April 6, 1939, Serial No. 266,352

4 Claims. (Cl. 43—35)

My invention relates to fish lures and has for its principal object the provision of a practical and as nearly as possible weedless lure, and one having the desirable characteristic of the hooks normally not extending from the lure, which is known to be objectionable from the standpoint of frightening the fish, as well as its liability to become snagged on contacting weeds or the like.

Another object is to provide such a device that will function to catch a fish only when being grasped or sprung by the action of the fish Other objects and advantages of the invention will appear in the following description thereof.

Referring now to the accompanying drawing forming part of this application, and wherein like reference characters indicate like parts:

Figure 1:
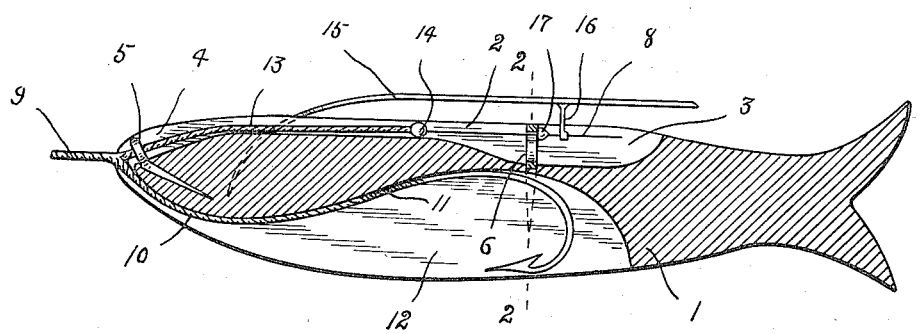
Figure 1 is a longitudinal sectional view of a lure simulating a minnow and to which one embodiment of the invention is applied, and illustrating the device as being set for a catch.
Figure 2:
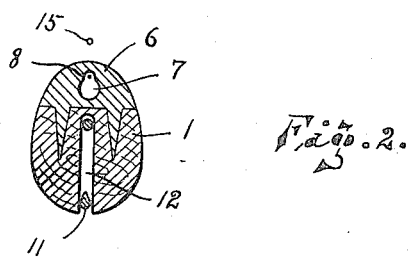
Figure 2 is a cross section on the line 2—2, Figure 1.
Figure 3:
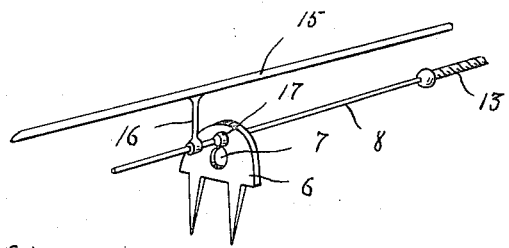
Figure 3 is a diagrammatic perspective view slightly enlarged to illustrate more clearly the action of the operating mechanism.

Referring now to the cooperative parts, 1 represents the minnow, which obviously may be made to represent some other form of aquatic life, such as a frog, or the like, provided with a longitudinal slot illustrated at 2 in the fore-part of the body of the minnow. This slot terminates in a somewhat deeper or well like portion 3 at the rear end thereof and which slot extends downwardly into the head portion of the minnow as at 4 providing convenience for the installation of an eyelet indicated at 5 which is not only hid from view in the enlarged portion of the slot but prevents any possibility of weeds becoming snagged thereabouts when the lure is being drawn through such.

At the junction of the rear portion of the slot 2 with the well 3 there is installed in any desired manner a vertically disposed metal plate indicated at 6 and which is provided with a key-hole shaped slot 7 for the reception of the wire 8. This wire is of considerable extent and forms one terminus of the branch 13 of the fish line 9, this line being provided also with the other branch 10 which terminates in the single fish hook 11 housed within the slot 12 in the belly of the minnow.

The attachment of the wire terminal 8 to the branch 13 of the line 9 is illustrated at 14 and is of sufficient size to prevent the branch 13 of the line and the wire 8 from being pulled entirely through the eye 5, however permitting ample action of the line to fully withdraw the hook 11 from the slot in the belly of the minnow.

Slightly above and longitudinally of the back of the fish is installed in any desired manner the trigger wire 15 and which is normally disposed as illustrated, that is with its free end having a normal spring tension upwardly, and which, just above and rearwardly of the wire 8, carries a depending eyelet member 16 through which the outer end of the wire 8 extends when the lure is set. Fixed upon the wire 8 intermediate of the eyelet 16 and the plate 6 is normally carried a ball or enlargement 17 which is of a size to freely pass through the lower larger portion of the key-hole 7 but cannot pass through the smaller portion thereof, so that when the lure is set as clearly illustrated in Figure 1 of the drawing, the ball occurs intermediate of the eyelet 16 and the plate 6, but instantly on depression of the trigger wire 15 as for example by the grasping of the lure in the mouth of a fish and the wire 8 is depressed sufficiently to permit of the ball 17 to freely pass through the larger portion of the key-hole 7, as it is naturally biased towards such passage by forward draft upon the line when such a strike is experienced, such action instantly draws the hook 11 from its secluded position outwardly into the mouth of the fish making the strike.

The hook 11 is preferably held in position within the slot 12 by the latter being of a size to snugly frictionally engage same when forced therein, and, if necessary, the hook may be slightly twisted or provided with a slight lateral bend so that it requires sufficient friction to force it into the slot to cause it to normally remain there and not require any considerable draft thereupon to release same for engagement within the mouth of the fish being caught.

It is to be understood that various modifications of the structure here shown and without departing from the spirit of the invention as set forth in the appended claims may be resorted to if deemed advisable, and that obviously such a lure may be used in tandem and modified arrangements of hooks employed as desired.

Having thus described my invention, what I claim and desire to secure by Letters Patent is:

1. In a fish lure, a main body portion having head and tail members, a bifurcated holding line having one portion threaded through the nose of said head and extending rearwardly along the back of said body and releasably so held, the other bifurcated portion of said holding line terminating in a catching hook, means for releasably holding said hook within said body portion, and trigger means upon the back of said body for release to a predetermined extent only of said threaded portion of said holding line 2. An artificial fish lure of the type described, comprising a body portion having a slot therein, a bifurcated holding line normally lying within said slot, said line carrying a hook normally hidden at one terminus and means at one side of the body for releasably holding said hook within said slot, said means being operable to release the hook to catching position by the grasping action of a fish upon said lure.

3. The combination set forth in claim 2, said means including a trigger member extending longitudinally of said body and spaced above the back thereof, whereby to insure catching action of the device when grasped from either end or side thereof.

4. In a fish lure, a body portion simulating a creature and having a slot like chamber longitudinally the back thereof, and a slot longitudinally the belly thereof, a bifurcated holding line with the termini thereof normally lying within said slots, an eyelet within the nose of said lure through which one of said bifurcated portions is threaded for holding engagement of the lure when either set or sprung, trigger mechanism within the slot in the back of the lure, and a depressable trigger spaced above said mechanism for operating same.

LEO J. FOX.